United States Patent
Ruark et al.

(10) Patent No.: US 7,590,283 B2
(45) Date of Patent: Sep. 15, 2009

(54) REPRESENTING COLORS IN STORED IMAGES USING COLOR TINTING

(75) Inventors: Holly Lynn Ruark, Belmont, CA (US); Sandra Mae Voelker, San Francisco, CA (US); Ryan Eric Ingram, San Francisco, CA (US); Mike Ryan Olsen, San Mateo, CA (US); James Gill Brooks, San Francisco, CA (US)

(73) Assignee: Electronic Arts, Inc., Redwood City, CA (US)

( * ) Notice: Subject to any disclaimer, the term of this patent is extended or adjusted under 35 U.S.C. 154(b) by 652 days.

(21) Appl. No.: 10/845,757

(22) Filed: May 13, 2004

(65) Prior Publication Data

US 2004/0257377 A1     Dec. 23, 2004

Related U.S. Application Data

(60) Provisional application No. 60/470,003, filed on May 13, 2003.

(51) Int. Cl.
    *G06K 9/00*     (2006.01)
    *G09G 5/02*     (2006.01)

(52) U.S. Cl. ...................................... 382/167; 345/589

(58) Field of Classification Search ................. 345/589; 382/167

See application file for complete search history.

(56) References Cited

U.S. PATENT DOCUMENTS

| | | | |
|---|---|---|---|
| 5,241,372 A | | 8/1993 | Ohba |
| 5,673,065 A | | 9/1997 | Deleeuw |
| 5,914,729 A | * | 6/1999 | Lippincott .................. 345/536 |
| 5,940,067 A | * | 8/1999 | Greene ........................ 345/536 |
| 6,259,439 B1 | * | 7/2001 | Lippincott .................. 345/549 |
| 7,038,696 B2 | * | 5/2006 | Emerson et al. ............. 345/600 |
| 2003/0011610 A1 | * | 1/2003 | Kitsutaka .................... 345/582 |

* cited by examiner

*Primary Examiner*—Vikkram Bali
*Assistant Examiner*—Max Shikhman
(74) *Attorney, Agent, or Firm*—Philip H. Albert; Townsend and Townsend and Crew LLP

(57) ABSTRACT

In an image processor, images are created, stored, manipulated and regenerated using color tinting, where color tinting applies component-to-color mapping from a color card to a plurality of component images, which are then combined to form a final image, tinted according to the content of the color card. In some instances, the color card might code one color for each of N components, in which case the final image might be the merging of each of N monochromatic component images colored by the color coded by the color card. In other instances, the color card codes for intensity levels or a texture.

8 Claims, 3 Drawing Sheets

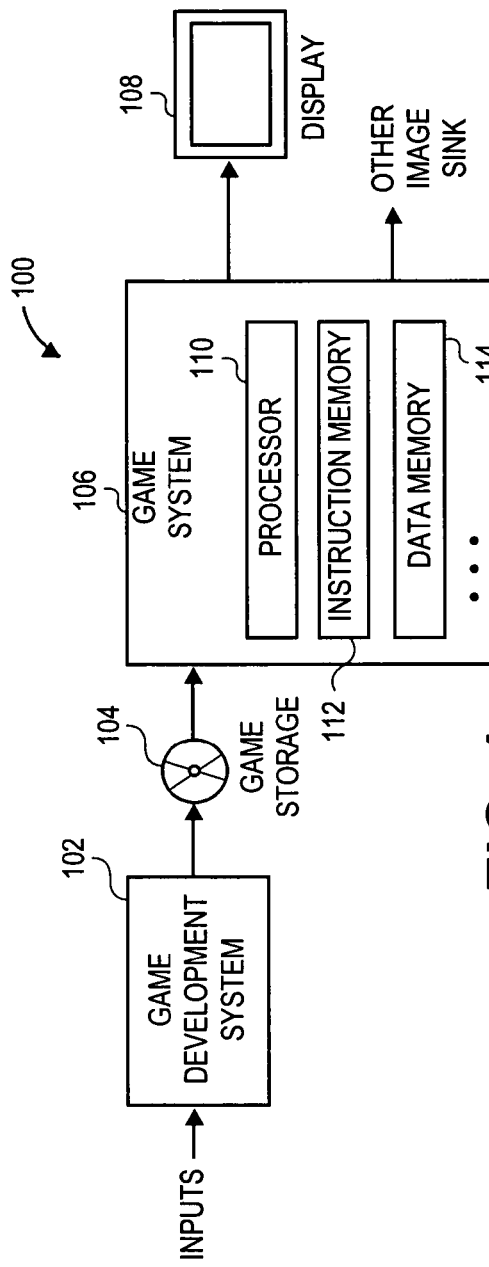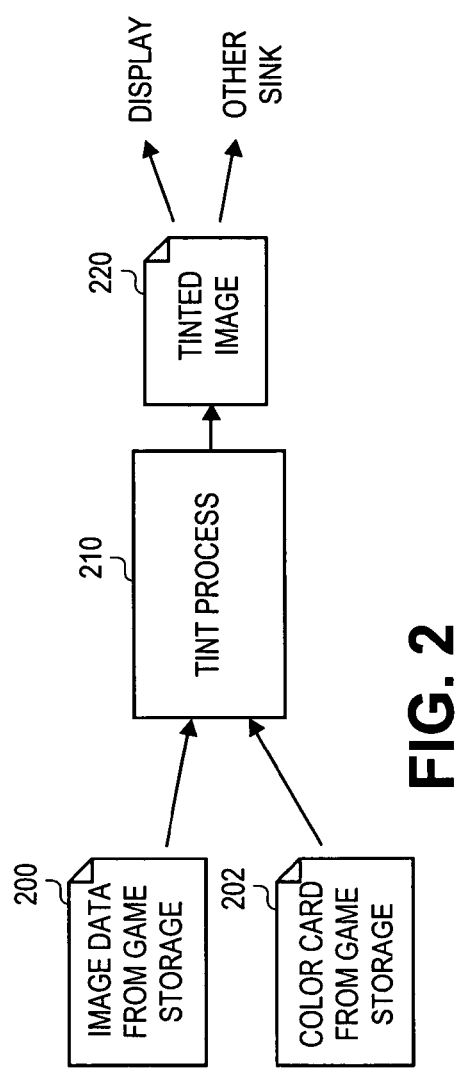

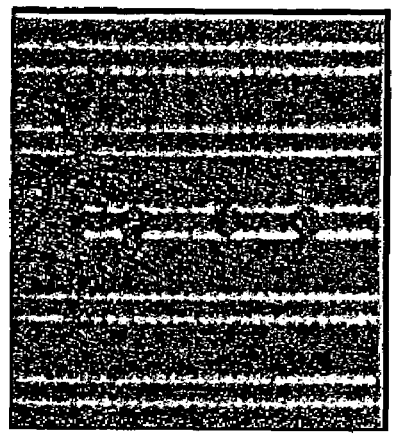
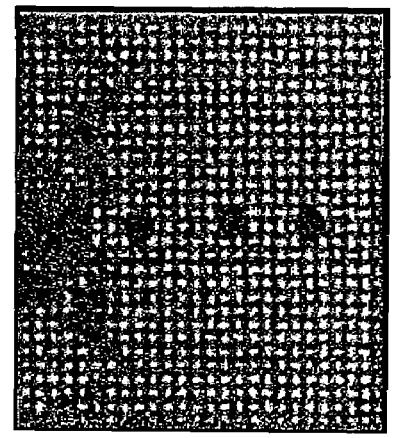
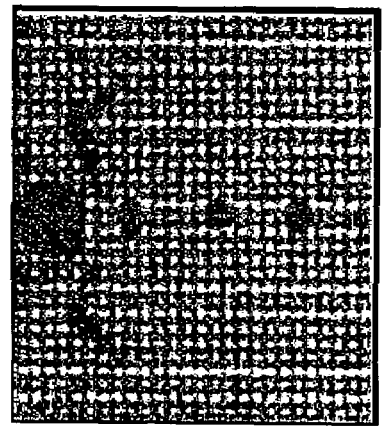
FIG. 4

REPRESENTING COLORS IN STORED IMAGES USING COLOR TINTING

CROSS-REFERENCE TO RELATED APPLICATIONS

This application claims priority from co-pending U.S. Provisional Patent Application No. 60/470,003 filed May 13, 2003 entitled REPRESENTING COLORS IN STORED IMAGES USING COLOR TINTING which is hereby incorporated by reference, as if set forth in full in this document, for all purposes.

FIELD OF THE INVENTION

The present invention relates generally to image representation and in particular to efficiently storing and using color images.

BACKGROUND OF THE INVENTION

Digital images are typically represented by an N-dimensional array of pixel color values or tuples. For example, a two-dimensional color image might be represented by a two-dimensional array of pixels, where each pixel is assigned a pixel color according to a red-green-blue (RGB) triple, and where each component of the triple is represented by a finite value. Other color spaces might be used, but generally an image is representable by each pixel having a pixel color selected from a color space. Examples of color spaces include RGB, CYMK (cyan-yellow-magenta-black) and sometimes include a transparency value, such as an alpha value.

For images where each pixel might have a value from 0 to 255 for a red component, 0 to 255 for a green component and 0 to 255 for a blue component, 24-bits are used to represent each pixel in an uncompressed image. Often, this is too much memory to be used per pixel and much of the resolution might not be used, such as where only a few colors are actually present in the image. Furthermore, when multiple images are part of a display and might have much in common, but different color patterns, storage is used for the multiple images, further requiring additional memory.

Palettes (or color lookup tables; "CLUTs") are often used to reduce the per-pixel bit requirements. With a palette approach, the color value or tuple for each differently colored pixel is entered in a table. If the table is too large, some pixel values might be folded into others to reduce the table size (for some loss of image quality in many cases). Then, each pixel is represented by an index into the table rather than its pixel color tuple. Paletting allows for quick color substitution, as a change in an entry in the palette table causes all pixels of that color to change.

These techniques do not allow an image designer a full range of features. It would be desirable to overcome the shortcomings of the prior art described above.

BRIEF SUMMARY OF THE INVENTION

In one embodiment of an image processor, images are created, stored, manipulated and regenerated using color tinting, where color tinting applies component-to-color mapping from a color card to a plurality of component images, which are then combined to form a final image, tinted according to the content of the color card. In some instances, the color card might code one color for each of N components, in which case the final image might be the merging of each of N monochromatic component images colored by the color coded by the color card. In other instances, the color card codes for intensity levels or a texture.

A further understanding of the nature and the advantages of the inventions disclosed herein may be realized by reference to the remaining portions of the specification and the attached drawings.

BRIEF DESCRIPTION OF THE DRAWINGS

The figures illustrate various aspects of embodiments of the invention.

FIG. 1 is a block diagram of a system for generating game data, storing game data and generating images for presentation by a game system according to aspects of the present invention.

FIG. 2 is a flow diagram illustrating one process for tinting image data to form a tinted image usable in a game system such as shown in FIG. 1.

FIG. 4 illustrates images showing aspects of a tinting process.

DETAILED DESCRIPTION OF THE INVENTION

Figure 3:
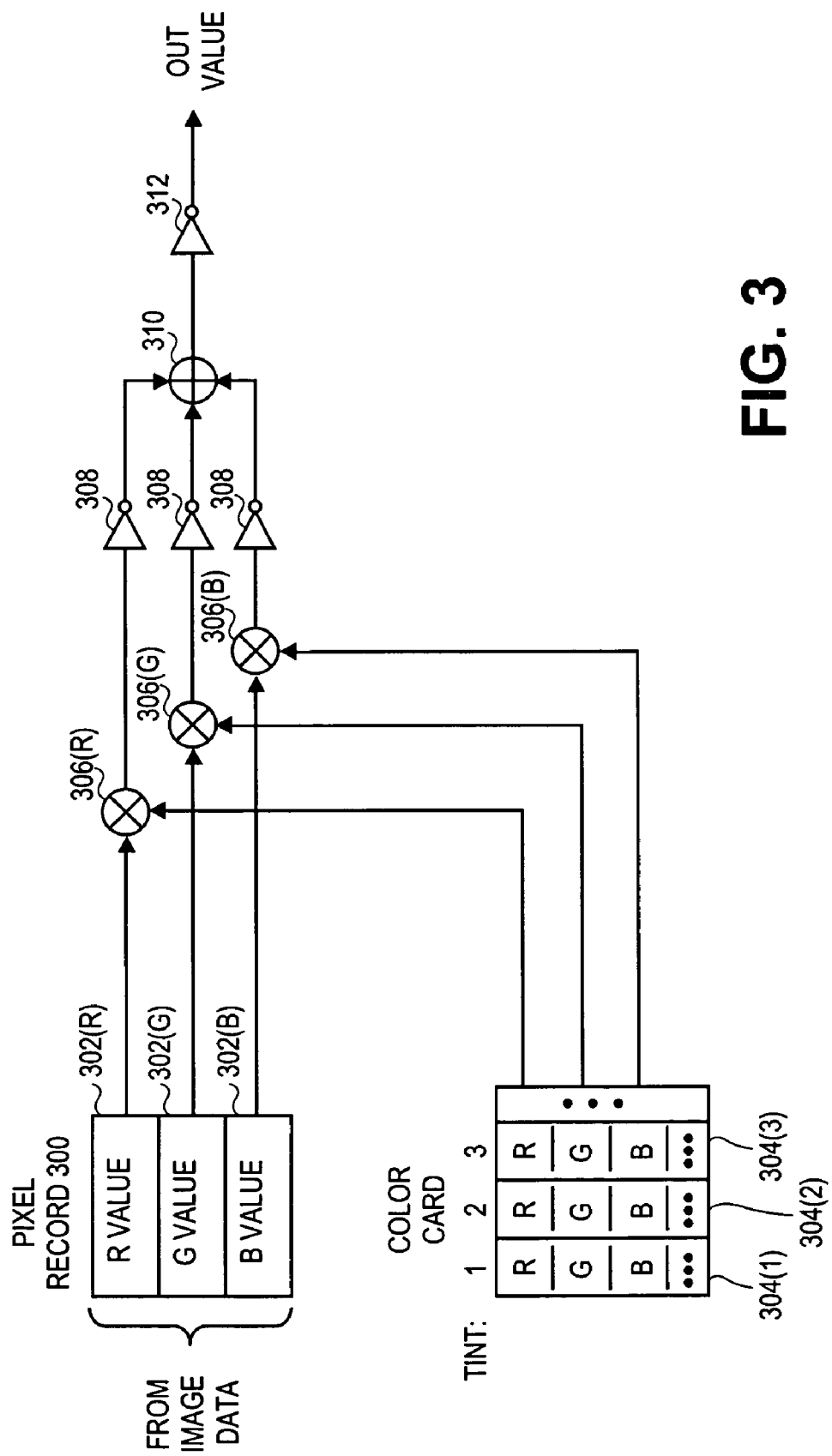
FIG. 3 is a schematic diagram of tint logic for generating an output pixel value from pixel values from a pixel record and a color card.

FIG. 1 is a block diagram of a system 100 for generating game data, storing game data and generating images for presentation by a game system according to aspects of the present invention. Other variations should be apparent upon review of this disclosure. As shown, inputs provided to a game development system 102 can be used to generate a game including images that is represented in game storage 104. Although the example of game storage 104 is illustrated as a CD-ROM, it should be apparent that other storage media could also be used. Of particular interest is the ability to efficiently store image data on game storage 104, to reduce memory requirements, allow for large flexibility in image generation, save computation in generating final images, and other benefits.

Game storage 104 can provide the necessary information for a game system 106 to execute a video game including presentation of suitable images. In addition to game applications, the present invention could be applied to other applications that use multiple color images. The images generated by game system 106 could be displayed on a display 108 or provided to other image sinks that would use those images.

An example of some components of game system 106 are shown in FIG. 1 including a processor 110, instruction memory 112 for storing game instructions provided by game storage 104 or other sources, and data memory 114 for storing data provided by game storage 104 or other sources or data generated during the operation of game system 106.

FIG. 2 is a flow diagram illustrating one process for tinting image data to form a tinted image usable in game system 106. As shown there, a tint process 210 receives image data 200 and color card contents 202 from game storage 104. The color card contents 202 might be obtained from other sources, and the color card generally refers to a dataset that identifies the transformation from image data to a tinted image 220, which can then be provided to a display or other image sink.

FIG. 3 is a schematic diagram of tint logic for generating an output pixel value from pixel values from a pixel record and a color card. This tint logic might be used to generate one or more of a plurality of images from a representation of a raw image, such as an image from image data stored on game storage 104, where the raw image is stored as N component images wherein N is greater than one. The color card is a dataset providing a component-to-color mapping for each of the N components. Notably, the mappings can be independent of the components used to represent the raw image. The mappings might represent colors to which the components are to be mapped and the mappings might also represent textures or more complex mappings.

One pixel record 300 is shown, comprising pixel values 302(R), 302(G) and 302(B) for a given pixel of the raw image. Where the color card is for simple color mapping, the color card might comprise a tint value 304 for each component. Note that the tint values 304 can be vector quantities with dimensions comparable to the number of components (or different dimensions).

The illustrated example will now be described, but it should be understood that other variations are possible. The pixel values 302 are multiplied by their corresponding tint values 304(1), 304(2) and 304(3) using multipliers 306, which provide their results to inverters 308, which in turn output to an adder 310. The output of adder 310 is inverted by inverter 312, which provides the output value for the pixel. In effect, the "red", "green" and "blue" channels (components) of the raw image are each multiplied by a new color, subtracted from white to get an inverse, the inverses are multiplied by each other (logically "adding" the colors together) and the result is inverted to get the final image.

These operations can be done by discrete hardware elements, as software steps, or other techniques to achieve similar results. Mathematically, the operations might be as shown in the following equations, where the raw values for a pixel stored as image data is represented by the variables InR, InG and InB, the range of color values for a component (and an output component) is 0 to M (e.g., M=255), the function T(x, y) refers to the y-th component of the x-th tint value from the color card, and the color of the output pixel is (OutR, OutG, OutB).

$$\text{Out}R=((M-(\text{In}R/M*T(1,R)))*(M-(\text{In}G/M*T(2,R)))*\\(M-(\text{In}B/M*T(3,R))))-M$$

$$\text{Out}G=((M-(\text{In}R/M*T(1,G)))*(M-(\text{In}G/M*T(2,G)))*\\(M-(\text{In}B/M*T(3,G))))-M$$

$$\text{Out}B=((M-(\text{In}R/M*T(1,B)))*(M-(\text{In}G/M*T(2,B)))*\\(M-(\text{In}B/M*T(3,B))))-M \quad \text{(Equ. 1-3)}$$

Offsets might be added where the range is not from 0 to M, or as needed to keep the values within expected ranges. Where the tint values T( ) do not also range from 0 to M, one or more normalizing factors might be added. In a color-additive space, the following set of equations might be more appropriate:

$$\text{Out}R=(\text{In}R/M*T(1,R))+(\text{In}G/M*T(2,R))+(\text{In}B/M*T(3,R)) \quad \text{(Equ. 4)}$$

$$\text{Out}G=(\text{In}R/M*T(1,G))+(\text{In}G/M*T(2,G))+(\text{In}B/M*T(3,G)) \quad \text{(Equ. 5)}$$

$$\text{Out}B=(\text{In}R/M*T(1,B))+(\text{In}G/M*T(2,B))+(\text{In}B/M*T(3,B)) \quad \text{(Equ. 6)}$$

Thus, the three component values (which are R, G and B here, but those are arbitrary assignments) can be replaced with any three colors as determined by the color card. Using this approach, only one texture and one palette are needed per use, saving considerable memory. Any color can be combined with any texture, resulting in less work for texture artists as well.

Using the above-described arrangement, a plurality of different tinted images can be generated by a game system from a single set of image data using different color cards. It should also be noted that the different tinted images in the plurality of images may appear quite different from each other. For example, consider an image data arrangement wherein the image data comprises three component images and various color cards are used. For a color card mapping each component to the same color, the resulting image would be monochromatic and image elements might run together. For a color card mapping each component to different colors and possibly mapping components to textures, the resulting image would look much different. Of course, for some color card variations, the resulting images would look similar but with different colors. For example, two color card mappings, one mapping three components to red, green and blue and the other mapping three components to yellow, violet and orange would result in two-differently colored images, but images that would look quite similar.

For example, consider the images shown in FIG. 4. The first image represents the image data provided to the tint process as a three component image. Suppose, for example, that the light and dark areas of a first and second component image are the primary cause of the "weave" pattern and a third component images is the primary cause of the vertical stripes. Suppose further that a color card A maps the first and second component images to distinct colors and maps the third component image to a low contrast range of another color. The result is a shirt image with a weave pattern and no stripes. Now, using a different color card B, which maps the first and second component images to very similar colors and maps the third component image to a contrasting color, the result is quite different—a shirt image with a weak weave pattern and strong stripes. Since both of these images can generated from the same image data, this allows a game developer more flexibility in patterns and objects usable in images. Using this technique, an array of differently appearing clothing or other objects could be easily represented by a single set of image data.

There are a number of ways to prepare a base image for storage as image data to be used for generating one or more of a plurality of images. For example, one could simply separate the base image into red, green and blue components. In other variations, the components do not end up corresponding to color values added by the color card, but instead represent other aspects of the image, such as value ranges or slight color/value modifications.

For example, the base image might be separated into highlight pixels (the brightest pixels), midtones (the middle brightness pixels) and shadow pixels (the darkest pixels). This separation is useful for hair and other smooth organic forms. Separating color channels through painting while preserving the pixel value is useful on clothing and separating color channels for slight color and value modifications is useful on skin.

For the range separation, the brightest pixels are assigned to the "red" component of the raw image (note that they are not necessarily red, but are stored in that component), the pixel values around 50% grey are assigned to the "green" component of the raw image, and the darkest pixels are assigned to the "blue" component of the raw image. When generating the image, a color card would be used with tint 1 being the color for coloring highlights (the "highlight" color, tint 2 for coloring midtones and tint 3 for coloring shadows. This permits the generating of many different appearing images from one base texture.

Where a histogram of the base image does not span the full range of values, the base image could be normalized to widen the histogram for maximum range. Alternatively, the thresholds between highlighting, midtones and shadows could be adjusted accordingly to get good separation. Such threshold adjustment could be done manually or automatically.

In some cases or range separation, dark hairline edges might occur between two colors. Thus, instead of using logic according to the above formula set in Equations 1-3, the following formula set in Equations 7-9 might be used instead (with suitable normalization of T( ) as appropriate):

$$\mathrm{Out}R = ((\mathrm{In}R/M * T(1, R)) * (\mathrm{In}G/M * T(2, R)) * (\mathrm{In}B/M * T(3, R))) \quad \text{(Equ. 7)}$$

$$\mathrm{Out}G = ((\mathrm{In}R/M * T(1, G)) * (\mathrm{In}G/M * T(2, G)) * (\mathrm{In}B/M * T(3, G))) \quad \text{(Equ. 8)}$$

$$\mathrm{Out}B = ((\mathrm{In}R/M * T(1, B)) * (\mathrm{In}G/M * T(2, B)) * (\mathrm{In}B/M * T(3, B))) \quad \text{(Equ. 9)}$$

In some images, different formula sets can be used for different elements. For example, hair and skin colors might be generated using the Equations 7-9 while clothes colors are generated using the "adding" formulae of Equations 1-3. The formula sets need not be limited to the adding formula set or the multiplying formula set of Equations 7-9, as other formula sets are possible. For example, the components could be combined using "over", "difference" "atop", "inside", "outside", etc. operators. In the above examples, the operators are similar for each component, but that need not be the case and different formulae can be used for different components.

For skin images, such as player faces in a game, one base image can be used and different color cards used to provide different skin tones. Thus, different images with different skin tones can be generated by a game from one base image stored in game storage, saving storage space and making development easier.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a computer graphics system wherein a plurality of images are to be generated from image data and the plurality of images are multi-colored, an improved method of representing the plurality of images comprising:

obtaining a representation of a raw image usable to generate one or more of the plurality of images;

storing a representation of the raw image using an N-color space comprising N component images wherein N is greater than one;

storing a coloring card representing a component-to-color mapping for each of the N components, wherein the coloring card comprises N entries to correspond with each of the N components where each of the N entries maps one of the N components to a color;

for each of the N components, determining an output of an operation using, as input to the operation, the N component of the raw image and the color mapped to the N component, wherein the operation includes multiplying the N component of the raw image with the color mapped to the N component, further comprising using a processor to perform the steps of:

inverting the output of the operation for each of the N component;

summing the inverted output of the operation for each of the N components; and generating the at least one image of the plurality of images based upon the summation; and generating at least one image of the plurality of images using the output of each of the N components and the coloring card from components of the representation of the raw image, wherein the component-to-color mappings from the components to the colors are independent of the components used to represent the raw image.

2. The method of claim 1, wherein N=3 and the N component images comprise a red component image, a green component image, and a blue component image.

3. The method of claim 1, further comprising storing a distinct color card for each distinctly colored image in the plurality of images.

4. The method of claim 1, wherein the coloring card holds values representing colors to correspond with corresponding component images.

5. The method of claim 1, wherein the coloring card holds values representing intensity of colors to correspond with corresponding component images.

6. The method of claim 1, wherein each component-to-color mapping maps a constant color value to component such that a color value of each pixel of the at least one image is the same for the same pixel values in the component images.

7. The method of claim 1, wherein component-to-color mappings map a color value to component such that a color value of each pixel of the at least one image may vary for the same pixel values in the component images, resulting in textures determined by a location dependency of the component-to-color mappings.

8. The method of claim 1, further comprising:

inverting the output of the summation prior to generating the at least one image of the plurality of images.

* * * * *

UNITED STATES PATENT AND TRADEMARK OFFICE
CERTIFICATE OF CORRECTION

PATENT NO. : 7,590,283 B2  Page 1 of 1
APPLICATION NO. : 10/845757
DATED : September 15, 2009
INVENTOR(S) : Ruark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-first Day of September, 2010

David J. Kappos
*Director of the United States Patent and Trademark Office*